(12) United States Patent
Lee et al.

(10) Patent No.: US 10,428,907 B2
(45) Date of Patent: Oct. 1, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Kyeong Hun Lee, Seoul (KR); Jong Sool Park, Hwaseong-si (KR); Jong Soo Kim, Seoul (KR); Dong Hwan Hwang, Seoul (KR); Jin Ho Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 75 days.

(21) Appl. No.: 15/816,872

(22) Filed: Nov. 17, 2017

(65) Prior Publication Data

US 2019/0120337 A1    Apr. 25, 2019

(30) Foreign Application Priority Data

Oct. 19, 2017    (KR) .......................... 10-2017-0135814

(51) Int. Cl.
*F16H 3/66*    (2006.01)

(52) U.S. Cl.
CPC .............. *F16H 3/66* (2013.01); *F16H 3/666* (2013.01); *F16H 2200/0065* (2013.01); *F16H 2200/2015* (2013.01); *F16H 2200/2046* (2013.01)

(58) Field of Classification Search
CPC .............. F16H 3/66; F16H 2200/0065; F16H 2200/2046; F16H 2200/2015
See application file for complete search history.

(56) References Cited

U.S. PATENT DOCUMENTS

| | | | | |
|---|---|---|---|---|
| 3,264,902 A * | 8/1966 | Breting | ..................... | F16H 3/66 475/286 |
| 4,531,428 A * | 7/1985 | Windish | .................... | F16H 3/66 475/279 |
| 7,297,085 B2 * | 11/2007 | Klemen | ..................... | F16H 3/66 475/280 |

FOREIGN PATENT DOCUMENTS

| | | | | |
|---|---|---|---|---|
| DE | 102016222226 A1 * | 5/2018 | ............... | F16H 3/66 |
| DE | 102016224388 A1 * | 6/2018 | ............... | F16H 3/66 |

* cited by examiner

*Primary Examiner* — Jacob S. Scott
*Assistant Examiner* — James J Taylor, II
(74) *Attorney, Agent, or Firm* — Morgan, Lewis & Bockius LLP

(57) ABSTRACT

A planetary gear train may include first to fifth planetary gear sets having first to third, fourth to sixth, seventh to ninth, and tenth to twelfth elements, a first shaft fixedly connected to the first and eleventh elements and input shaft, a second shaft fixedly connected to the second element and one element of the fifth planetary gear set, selectively connectable to the input shaft and a transmission housing, a third shaft fixedly connected to the eighth element and output shaft, a fourth shaft fixedly connected to the third and fifth elements, a fifth shaft fixedly connected to the sixth, seventh, tenth, and another element of the fifth planetary gear set not connected to the second shaft, a sixth shaft fixedly connected to the twelfth element, a seventh shaft fixedly connected to a remaining element of the fifth planetary gear set not connected to the first and second shafts.

20 Claims, 6 Drawing Sheets

FIG. 2

| Shift-stage | Engagement element | | | | | | Gear ratio | Step ratio | Remark |
|---|---|---|---|---|---|---|---|---|---|
| | C1 | C2 | C3 | B1 | B2 | B3 | | | |
| D1 |  | ● |  |  | ● |  | 5.50 |  | |
| D2 |  | ● | ● |  | ● |  | 3.33 | 1.65 | |
| D3 | ● |  | ● | ● | ● |  | 2.31 | 1.44 | |
| D4 | ● |  |  | ● | ● |  | 1.66 | 1.39 | Gear ratio span : 9.14 |
| D5 | ● | ● | ● | ● |  |  | 1.21 | 1.37 | |
| D6 | ● | ● | ● |  |  |  | 1.00 | 1.21 | R/D1 ratio : 0.90 |
| D7 | ● |  |  | ● |  |  | 0.87 | 1.16 | |
| D8 | ● |  |  |  |  | ● | 0.72 | 1.21 | |
| D9 |  |  |  | ● |  | ● | 0.60 | 1.19 | |
| REV |  |  |  | ● | ● | ● | -4.90 | - | |

PLANETARY GEAR TRAIN OF AUTOMATIC TRANSMISSION FOR VEHICLE

CROSS-REFERENCE TO RELATED APPLICATION

The present application claims priority to Korean Patent Application No.-2017-0135814 filed on Oct. 19, 2017, the entire contents of which is incorporated herein for all purposes by this reference.

BACKGROUND OF THE INVENTION

Field of the Invention

The present invention relates to an automatic transmission for a vehicle.

Description of Related Art

In the field of an automatic transmission, more multiplicity of shift-stages is useful technology for enhancement of fuel consumption and drivability of a vehicle.

In this sense, research for an engine has been made to achieve weight reduction and to enhance fuel consumption by so-called downsizing and research on an automatic transmission has been performed to simultaneously provide better drivability and fuel consumption by achieving more shift stages.

To achieve more shift-stages for an automatic transmission, the number of parts is typically increased, which may deteriorate installability, a production cost, weight and/or power flow efficiency.

Therefore, to maximally enhance fuel consumption of an automatic transmission having more shift-stages, it is important that better efficiency is derived by less number of parts.

In this background, an eight-speed automatic transmission has been introduced recently and a planetary gear train for an automatic transmission facilitating more shift-stages is under investigation.

In addition, a recent eight-speed automatic transmission typically shows a gear ratio span in a level of 6.5 to 7.5, which may require improvement for better fuel consumption.

In the case of a gear ratio span of an eight-speed automatic transmission having a level above 9.0, it is difficult to maintain step ratios between adjacent shift stages to be linear, by which driving efficiency of an engine and drivability of a vehicle deteriorated. Thus, research studies are underway for developing a high efficiency automatic transmission having nine or more speeds.

The information included in this Background of the Invention section is only for enhancement of understanding of the general background of the invention and may not be taken as an acknowledgment or any form of suggestion that this information forms the prior art already known to a person skilled in the art.

BRIEF SUMMARY

Various aspects of the present invention are directed to providing a planetary gear train of an automatic transmission for a vehicle facilitating at least nine forward speeds, providing better performance and fuel efficiency of a vehicle.

A planetary gear train according to an exemplary embodiment of the present invention may include an input shaft receiving an engine torque, an output shaft outputting a shifted torque, a first planetary gear set having first, second and third rotation elements, a second planetary gear set having fourth, fifth, and sixth rotation elements, a third planetary gear set having seventh, eighth, and ninth rotation elements, a fourth planetary gear set having tenth, eleventh, and twelfth rotation elements, and a fifth planetary gear set having thirteenth, fourteenth, and fifteenth rotation elements. An exemplary planetary gear train may further include a first shaft fixedly connected to the first rotation element and the eleventh rotation element, and fixedly connected to the input shaft, a second shaft fixedly connected to the second rotation element and one rotation element of the fifth planetary gear set, selectively connectable to the input shaft, and selectively connectable to the transmission housing, a third shaft fixedly connected to the eighth rotation element and fixedly connected to the output shaft, a fourth shaft fixedly connected to the third rotation element and the fifth rotation element, a fifth shaft fixedly connected to the sixth rotation element, the seventh rotation element, the tenth rotation element, and another rotation element of the fifth planetary gear set which is not connected to the second shaft, a sixth shaft fixedly connected to the twelfth rotation element, a seventh shaft fixedly connected to a remaining rotation element of the fifth planetary gear set which is not connected to the first shaft and the second shaft, and a plurality of shafts each of which is selectively connectable to the transmission housing and fixedly connected to a rotation element of the second and third planetary gear sets which is not fixedly connected to any of the first to seventh shafts.

The plurality of shafts may include an eighth shaft fixedly connected to the fourth rotation element and selectively connectable to the transmission housing, and a ninth shaft fixedly connected to the ninth rotation element and selectively connectable to the transmission housing.

The exemplary planetary gear set may further include three clutches selectively connecting a corresponding pair among the input shaft, the output shaft, and the nine shafts, and three brakes selectively connecting the second shaft, the eighth shaft, and the ninth shaft to the transmission housing respectively, The thirteenth rotation element is fixedly connected to the seventh shaft. The fourteenth rotation element is fixedly connected to the second shaft. The fifteenth rotation element is fixedly connected to the fifth shaft. The third shaft and the sixth shaft, the fifth shaft and the seventh shaft, and the input shaft and the second shaft may be selectively interconnected respectively.

The exemplary planetary gear set may further include three clutches selectively connecting a corresponding pair among the input shaft, the output shaft, and the nine shafts, and three brakes selectively connecting the second shaft, the eighth shaft, and the ninth shaft to the transmission housing respectively, The thirteenth rotation element may be fixedly connected to the seventh shaft. The fourteenth rotation element may be fixedly connected to the fifth shaft. The fifteenth rotation element may be fixedly connected to the second shaft. The third shaft and the sixth shaft, the fifth shaft and the seventh shaft, and the input shaft and the second shaft may be selectively interconnected respectively.

The three clutches may include a first clutch disposed between the third shaft and the sixth shaft, a second clutch disposed between the fifth shaft and the seventh shaft, and a third clutch disposed between the input shaft and the second shaft. The three brakes may include a first brake disposed between the second shaft and the transmission housing, a second brake disposed between the eighth shaft and the transmission housing, and a third brake disposed between the ninth shaft and the transmission housing.

The exemplary planetary gear set may further include three clutches selectively connecting a corresponding pair among the input shaft, the output shaft, and the nine shafts, and three brakes selectively connecting the second shaft, the eighth shaft, and the ninth shaft to the transmission housing respectively, The thirteenth rotation element may be fixedly connected to the seventh shaft. The fourteenth rotation element may be fixedly connected to the fifth shaft. The fifteenth rotation element may be fixedly connected to the second shaft. The third shaft and the sixth shaft, the second shaft and the seventh shaft, and the input shaft and the second shaft are selectively connectable to respectively.

The exemplary planetary gear set may further include three clutches selectively connecting a corresponding pair among the input shaft, the output shaft, and the nine shafts, and three brakes selectively connecting the second shaft, the eighth shaft, and the ninth shaft to the transmission housing respectively, The thirteenth rotation element may be fixedly connected to the seventh shaft. The fourteenth rotation element may be fixedly connected to the second shaft. The fifteenth rotation element may be fixedly connected to the fifth shaft. The third shaft and the sixth shaft, the second shaft and the seventh shaft, and the input shaft and the second shaft are selectively connectable to respectively.

The exemplary planetary gear set may further include three clutches selectively connecting a corresponding pair among the input shaft, the output shaft, and the nine shafts, and three brakes selectively connecting the second shaft, the eighth shaft, and the ninth shaft to the transmission housing respectively, The thirteenth rotation element may be fixedly connected to the second shaft. The fourteenth rotation element may be fixedly connected to the fifth shaft. The fifteenth rotation element may be fixedly connected to the seventh shaft. The third shaft and the sixth shaft, the second shaft and the seventh shaft, and the input shaft and the second shaft are selectively connectable to respectively.

The three clutches may include a first clutch disposed between the third shaft and the sixth shaft, a second clutch disposed between the second shaft and the seventh shaft, and a third clutch disposed between the input shaft and the second shaft. The three brakes may include a first brake disposed between the second shaft and the transmission housing, a second brake disposed between the eighth shaft and the transmission housing, and a third brake disposed between the ninth shaft and the transmission housing.

The first, second and third rotation elements may be a first sun gear, a first planet carrier, and a first ring gear. The fourth, fifth, and sixth rotation elements may be a second sun gear, a second planet carrier, and a second ring gear. The seventh, eighth, and ninth rotation elements may be a third sun gear, a third planet carrier, and a third ring gear. The tenth, eleventh, and twelfth rotation elements may be a fourth sun gear, a fourth planet carrier, and a fourth ring gear. The thirteenth, fourteenth, and fifteenth rotation elements may be a fifth sun gear, a fifth planet carrier, and a fifth ring gear.

The first, second, third, fourth, and fifth planetary gear sets may be disposed in the order of the first, fifth, second, third, and fourth planetary gear sets from an engine side.

A planetary gear train according to an exemplary embodiment of the present invention may realize at least nine forward speeds and at least one reverse speed formed by operating the four planetary gear sets as simple planetary gear sets by controlling six engagement elements.

Furthermore, a planetary gear train according to an exemplary embodiment of the present invention may realize a gear ratio span of more than 9.1, maximizing efficiency of driving an engine.

While employing five planetary gear sets for nine forward speeds and one reverse speed, engagement elements are minimally employed, reducing drag loss of clutches and brakes, and accordingly improving power delivery efficiency and fuel consumption.

Furthermore, a torque-in-parallel scheme is applied to an output-side planetary gear set, and torque loads of planetary gear sets and engagement elements may become more uniform, such that torque delivery efficiency and durability may be enhanced.

While realizing nine forward speeds and one reverse speed, flexibility of output gear ratio is increased, enhancing linearity of step ratios of shift-stages.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages applicable to a planetary gear train according to various exemplary embodiments of the present invention.

Figure 1:
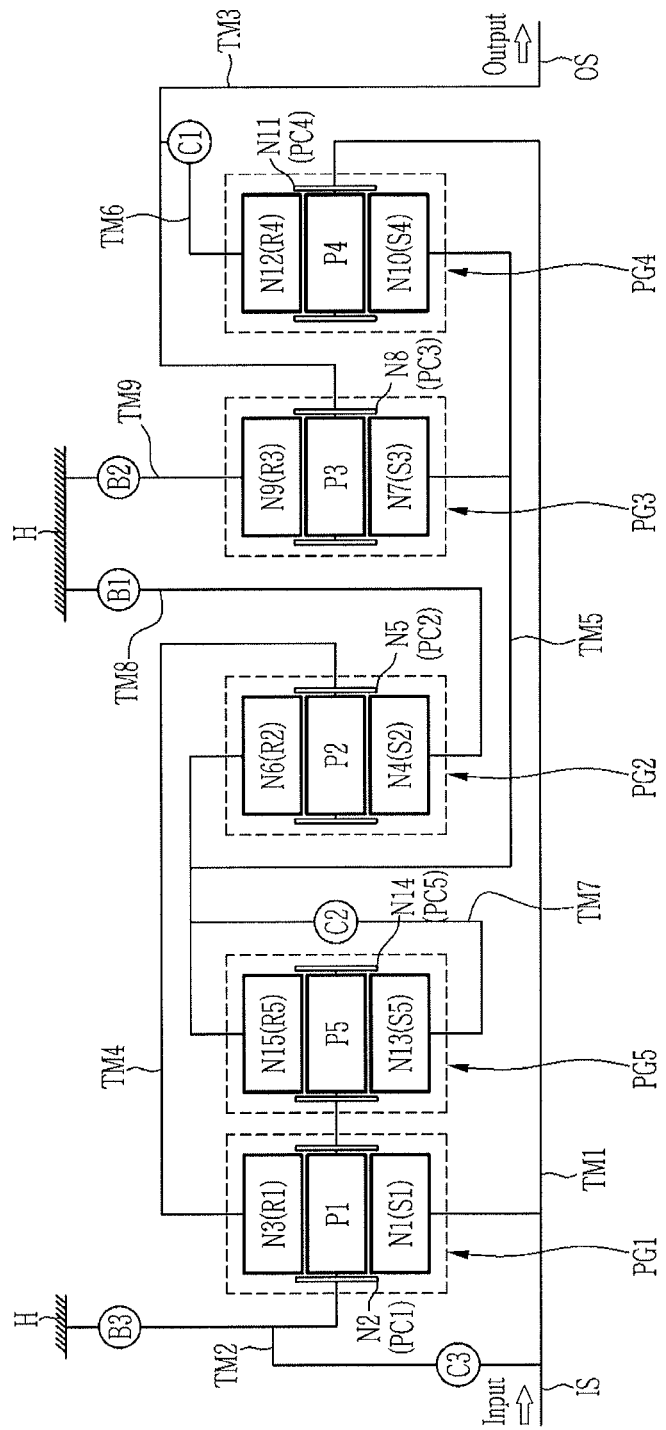
FIG. 1 is a schematic diagram of a planetary gear train according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described more specifically with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to various exemplary embodiments of the present invention.

Referring to FIG. 1, a planetary gear train according to various exemplary embodiments of the present invention may include first, second, third, fourth, and fifth planetary gear sets PG1, PG2, PG3, PG4, and PG5 disposed on a same axis, an input shaft IS, an output shaft OS, nine shafts TM1 to TM9 interconnecting rotation elements of the first, second, third, fourth, and fifth planetary gear sets PG1, PG2, PG3, PG4, and PG5, engagement elements of three clutches C1 to C3 and three brakes B1 to B3, and a transmission housing H.

A torque received from an engine through the input shaft is changed by cooperative operation of the first, second, third, fourth, and fifth planetary gear sets PG1, PG2, PG3, PG4, and PG5, and a shifted torque is output through the output shaft OS.

In the various exemplary embodiments, the planetary gear sets are disposed in the order of the first, the fifth, and the second, third, and fourth planetary gear sets (PG1, PG5, PG2, PG3, PG4), from an engine side.

The input shaft is an input member and the torque from a crankshaft of an engine is input into the input shaft IS, after being torque-converted through a torque converter.

The output shaft OS is an output element disposed on a same axis with the input shaft IS, and outputs a shifted driving torque to a driveshaft through a differential apparatus.

The first planetary gear set PG1 is a single pinion planetary gear set, and may include a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and may include a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and may include a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and may include a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear S4 acts as a tenth rotation element N10, the fourth planet carrier PC4 acts as an eleventh rotation element N11, and the fourth ring gear R4 acts as a twelfth rotation element N12.

The fifth planetary gear set PG5 is a single pinion planetary gear set, and may include a fifth sun gear S5, a fifth planet carrier PC5 rotatably supporting a plurality of fifth pinion gears P5 externally gear-meshed with the fifth sun gear S5, and a fifth ring gear R5 internally gear-meshed with the plurality of fifth pinion gears P5. The fifth sun gear S5 acts as a thirteenth rotation element N13, the fifth planet carrier PC5 acts as a fourteenth rotation element N14, and the fifth ring gear R5 acts as a fifteenth rotation element N15.

In the first, second, third, fourth, and fifth planetary gear sets PG1, PG2, PG3, PG4, and PG5, the first rotation element N1 and the eleventh rotation element N11 are fixedly interconnected, the second rotation element N2 and the fourteenth rotation element N14 are fixedly interconnected, the third rotation element N3 and the fifth rotation element N5 are fixedly interconnected, the sixth rotation element N6, the seventh rotation element N7, the tenth rotation element N01, and the fifteenth rotation element N15 are fixedly interconnected, and nine shafts TM1 to TM9 are formed.

The nine shafts TM1 to TM9 are hereinafter described in detail.

The first shaft TM1 is fixedly connected to first rotation element N1 (first sun gear S1) and eleventh rotation element N11 (fourth planet carrier PC4), and fixedly connected to the input shaft IS, constantly acting as an input element.

The second shaft TM2 is fixedly connected to second rotation element N2 (first planet carrier PC1) and fourteenth rotation element N14 (fifth planet carrier PC5).

The third shaft TM3 is fixedly connected to the eighth rotation element N8 (third planet carrier PC3), and fixedly connected to the output shaft OS constantly acting as an output element.

The fourth shaft TM4 is fixedly connected to third rotation element N3 (first ring gear R1) and fifth rotation element N5 (second planet carrier PC2).

The fifth shaft TM5 is fixedly connected to the sixth rotation element N6 (second ring gear R2), the seventh rotation element N7 (third sun gear S3), the tenth rotation element N10 (fourth sun gear S4), and the fifteenth rotation element N15 (fifth ring gear R5).

The sixth shaft TM6 is fixedly connected to the twelfth rotation element N12 (fourth ring gear R4).

The seventh shaft TM7 is fixedly connected to the thirteenth rotation element N13 (fifth sun gear S5).

The eighth shaft TM8 is fixedly connected to the fourth rotation element N4 (second sun gear S2).

The ninth shaft TM9 is fixedly connected to the ninth rotation element N9 (third ring gear R3).

Each of the nine shafts TM1 to TM9 may be a rotation member that fixedly interconnects the input and output shafts and rotation elements of the planetary gear sets PG1, PG2, PG3, PG4, and PG5, or may be a rotation member that selectively interconnects a rotation element to the transmission housing H, or may be a fixed member fixed to the transmission housing H.

In the disclosure, when two or more members are described to be "fixedly connected", where the member may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotates separately when the engagement element is not engaged, and rotates at a same speed when the engagement element is engaged. It may be understood that in the case that a member is "selectively connectable" with a transmission housing by an engagement element, the member may be stationary when the engagement element is engaged.

The third shaft TM3 is selectively connectable to the sixth shaft TM6, the fifth shaft TM5 is selectively connectable to the seventh shaft TM7, and the input shaft is selectively connectable to the second shaft TM2.

The eighth shaft TM8, ninth shaft TM9, and second shaft TM2 are selectively connectable to the transmission housing H, selectively acting as fixed elements respectively.

The three engagement elements of clutches C1, C2, and C3 are disposed between the nine shafts TM1 to TM9, the input shaft IS, and the output shaft OS, to form selective connections.

The three engagement elements of brakes B1, B2, and B3 are disposed between the nine shafts TM1 to TM9 and the transmission housing H, to form selective connections.

The six engagement element of the three clutches C1 to C3 and the three brakes B1 to B3 are disposed as follows.

The first clutch C1 is disposed between the third shaft TM3 and the sixth shaft TM6, and selectively connects the third shaft TM3 and the sixth shaft TM6, controlling power delivery therebetween.

The second clutch C2 is disposed between the fifth shaft TM5 and the seventh shaft TM7, and selectively connects the fifth shaft TM5 and the seventh shaft TM7, controlling power delivery therebetween.

The third clutch C3 is disposed between the input shaft IS and the second shaft TM2, and selectively connects the input shaft IS and the second shaft TM2, controlling power delivery therebetween.

The first brake B1 is disposed between the eighth shaft TM8 and the transmission housing H, and selectively connects the eighth shaft TM8 to the transmission housing H.

The second brake B2 is disposed between the ninth shaft TM9 and the transmission housing H, and selectively connects the ninth shaft TM9 to the transmission housing H.

The third brake B3 is disposed between the second shaft TM2 and the transmission housing H, and selectively connects the second shaft TM2 to the transmission housing H.

Referring to FIG. 1, the third clutch C3 has been described to selectively connect the second shaft TM2 to the input shaft IS. However, since the input shaft IS and the first shaft TM1 are always interconnected, the third clutch C3 may selectively connect the first shaft TM1 and the second shaft TM2, and the present configuration may be interpreted as equivalent.

The engagement elements of the first, second and third clutches C1, C2, and C3 and the first, second and third brakes B1, B2, and B3 may be realized as multi-plate hydraulic pressure friction devices that are frictionally engaged by hydraulic pressure, however, it may not be understood to be limited thereto, since various other configuration that are electrically controllable may be available.

FIG. 2 is an operational chart for respective control elements at respective shift-stages applicable to a planetary gear train according to various exemplary embodiments of the present invention.

referring to FIG. 2, a planetary gear train according to various exemplary embodiments realizes nine forward speeds and one reverse speed by operating three engagements among the first, second and third clutches C1, C2, and C3 and first, second and third brakes B1, B2, and B3.

In the first forward speed D1, the second clutch C2 and the first and second brakes B1 and B2 are simultaneously operated.

As a result, the fifth shaft TM5 and the seventh shaft TM7 are connected by the operation of the second clutch C2. In the present state, a torque is input to the first shaft TM1.

In such a state, the eighth and ninth shafts TM8 and TM9 act as fixed elements by the operation of the first and second brakes B1 and B2, realizing the first forward speed and outputting a shifted torque to the output shaft OS connected to the third shaft TM3.

In the second forward speed D2, the second and third clutches C2 and C3 and the second brake B2 are simultaneously operated.

As a result, the fifth shaft TM5 and the seventh shaft TM7 are connected by the operation of the second clutch C2, and the input shaft IS and the second shaft TM2 are connected by the operation of the third clutch C3. In the present state, a torque is input to the first shaft TM1 and the second shaft TM2.

Furthermore, the ninth shaft TM9 acts as a fixed element by the operation of the second brake B2, realizing the second forward speed and outputting a shifted torque to the output shaft OS connected to the third shaft TM3.

In the third forward speed D3, the third clutch C3 and the first and second brakes B1 and B2 are simultaneously operated.

As a result, the input shaft IS and the second shaft TM2 are connected by the operation of the third clutch C3. In the present state, a torque is input to the first shaft TM1 and the second shaft TM2.

In such a state, the eighth and ninth shafts TM8 and TM9 act as fixed elements by the operation of the first and second brakes B1 and B2, realizing the third forward speed and outputting a shifted torque to the output shaft OS connected to the third shaft TM3.

In the fourth forward speed D4, the first clutch C1 and the first and second brakes B1 and B2 are simultaneously operated.

As a result, the third shaft TM3 and the sixth shaft TM6 are connected by the operation of the first clutch C1. In the present state, a torque is input to the first shaft TM1.

In such a state, the eighth and ninth shafts TM8 and TM9 act as fixed elements by the operation of the first and second brakes B2, realizing the fourth forward speed and outputting a shifted torque to the output shaft OS connected to the third shaft TM3.

In the fifth forward speed D5, the first and third clutches C1 and C3 and the first brake B1 are simultaneously operated.

As a result, the third shaft TM3 and the sixth shaft TM6 are connected by the operation of the first clutch C1, and the input shaft IS and the second shaft TM2 are connected by the operation of the third clutch C3. In the present state, a torque is input to the first shaft TM1 and the second shaft TM2.

Furthermore, the eighth shaft TM8 acts as a fixed element by the operation of the first brake B1, realizing the fifth forward speed and outputting a shifted torque to the output shaft OS connected to the third shaft TM3.

In the forward sixth forward speed D6, the first, second and third clutches C1, C2, and C3 are simultaneously operated.

As a result, the third shaft TM3 and the sixth shaft TM6 are connected by the operation of the first clutch C1, the fifth shaft TM5 and the seventh shaft TM7 are connected by the operation of the second clutch C2, and the input shaft IS and the second shaft TM2 are connected by the operation of the third clutch C3.

As such, the first, second, third, fourth, and fifth planetary gear sets PG1, PG2, PG3, PG4, and PG5 integrally rotate, realizing the forward sixth forward speed where a torque is output as inputted and outputting a shifted torque through the output shaft OS connected to the third shaft TM3.

In the seventh forward speed D7, the first and second clutch C1 and C2 and the first brake B1 are simultaneously operated.

As a result, the third shaft TM3 and the sixth shaft TM6 are connected by the operation of the first clutch C1, and the fifth shaft TM5 and the seventh shaft TM7 are connected by the operation of the second clutch C2. In the present state, a torque is input to the first shaft TM1.

Furthermore, the eighth shaft TM8 acts as a fixed element by the operation of the first brake B1, realizing the seventh forward speed and outputting a shifted torque to the output shaft OS connected to the third shaft TM3.

In the eighth forward speed D8, the first and second clutch C1 and C2 and the third brake B3 are simultaneously operated.

As a result, the third shaft TM3 and the sixth shaft TM6 are connected by the operation of the first clutch C1, and the fifth shaft TM5 and the seventh shaft TM7 are connected by the operation of the second clutch C2. In the present state, a torque is input to the first shaft TM1.

Furthermore, the ninth shaft TM9 acts as a fixed element by the operation of the third brake B3, realizing the eighth forward speed and outputting a shifted torque to the output shaft OS connected to the third shaft TM3.

In the ninth forward speed D9, the first clutch Cl and the first and third brakes B1 and B3 are simultaneously operated.

As a result, the third shaft TM3 and the sixth shaft TM6 are connected by the operation of the first clutch C1. In the present state, a torque is input to the first shaft TM1.

In such a state, the eighth and second shafts TM8 and TM2 act as fixed elements by the operation of the first and third brakes B1 and B3, realizing the ninth forward speed and outputting a shifted torque to the output shaft OS connected to the third shaft TM3.

In the reverse speed REV, the first, second and third brakes B1, B2, and B3 are simultaneously operated.

As such, the eighth, ninth, and second shafts TM8, TM9, and TM2 act as fixed elements by the operation of the first, second and third brakes B1, B2, and B3, and a torque is input to the first shaft TM1, realizing the reverse speed and outputting a reverse torque through the output shaft OS connected to the third shaft TM3.

Figure 3:
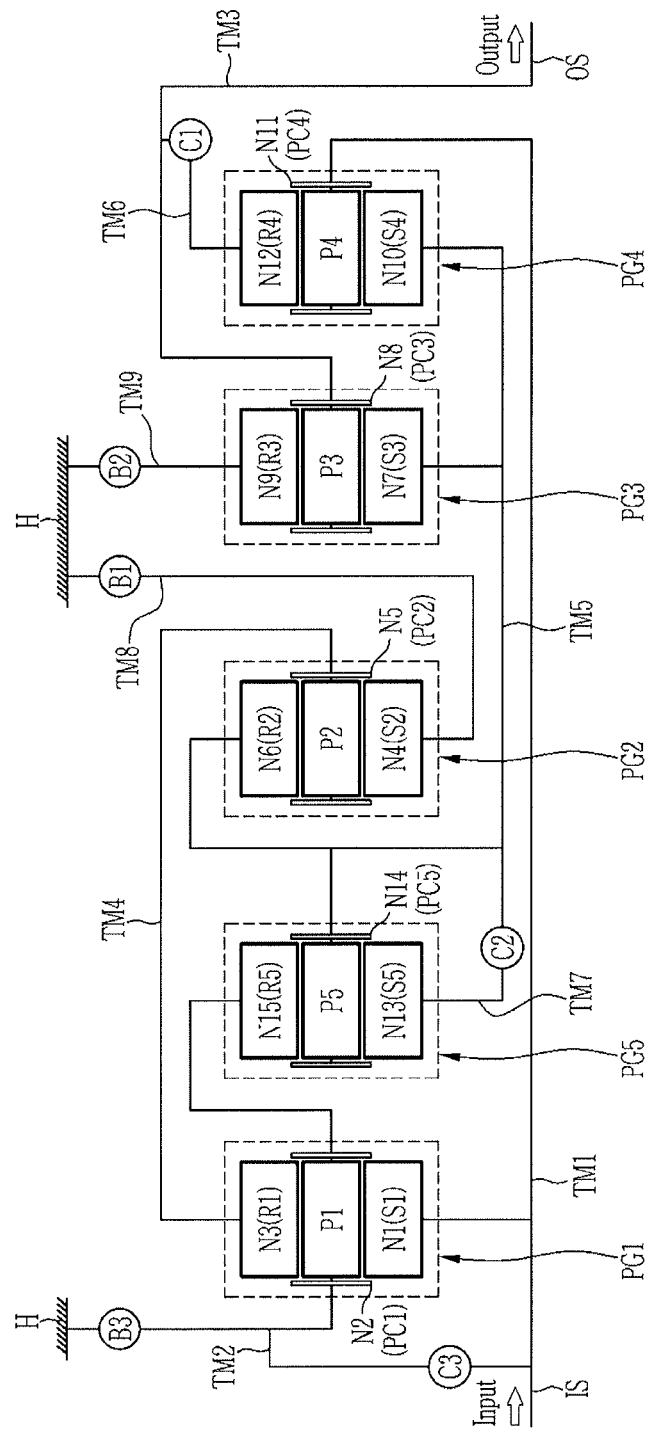
FIG. 3 is a schematic diagram of a planetary gear train according to various exemplary embodiments of the present invention.

FIG. 3 is a schematic diagram of a planetary gear train according to various exemplary embodiments of the present invention.

According to a planetary gear train according to various exemplary embodiments shown in FIG. 1, the thirteenth rotation element N13 is fixedly connected to the seventh shaft TM7, the fourteenth rotation element N14 is fixedly connected to the second shaft TM2, and the fifteenth rotation element N15 is fixedly connected to the fifth shaft TM5. In comparison, according to a planetary gear train according to various exemplary embodiments shown in FIG. 3, the thirteenth rotation element N13 is fixedly connected to the seventh shaft TM7, the fourteenth rotation element N14 is fixedly connected to the fifth shaft TM5, and the fifteenth rotation element N15 is fixedly connected to the second shaft TM2.

Although the various exemplary embodiments differs from the various exemplary embodiments in the fixed connections of the fifth planetary gear set PG5, operations and functions of the overall planetary gear train remains the same.

That is, the planetary gear train of the various exemplary embodiments may be operated by the same operational chart to achieve the same shaft-stages with the various exemplary embodiments.

Figure 4:
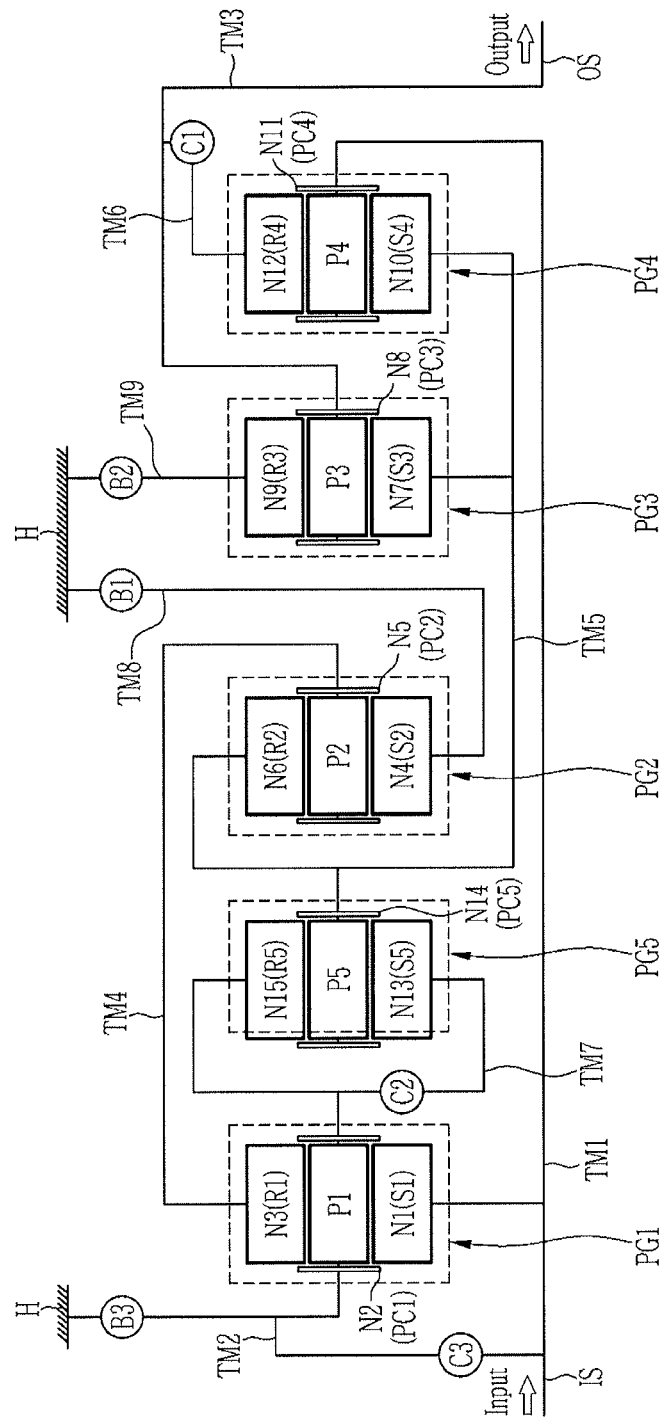
FIG. 4 is a schematic diagram of a planetary gear train according to various exemplary embodiments of the present invention.

FIG. 4 is a schematic diagram of a planetary gear train according to various exemplary embodiments of the present invention.

According to a planetary gear train according to various exemplary embodiments shown in FIG. 3, the second clutch C2 is disposed between the fifth shaft TM5 and the seventh shaft TM7 such that the fifth planetary gear set PG5 integrally rotates by the operation of the second clutch C2. According to a planetary gear train according to various exemplary embodiments shown in FIG. 4, the second clutch C2 is disposed between the second shaft TM2 and the seventh shaft TM7. It may be obviously understood that according to the various exemplary embodiments, the fifth planetary gear set PG5 integrally rotates by the operation of the second clutch C2.

That is, although the various exemplary embodiments differs from the various exemplary embodiments in the location of the second clutch C2, the function and operation of the second clutch C2 to integrally rotate the fifth planetary gear set PG5 remains the same.

That is, the planetary gear train of the various exemplary embodiments may be operated by the same operational chart to achieve the same shaft-stages with the various exemplary embodiments.

Figure 5:
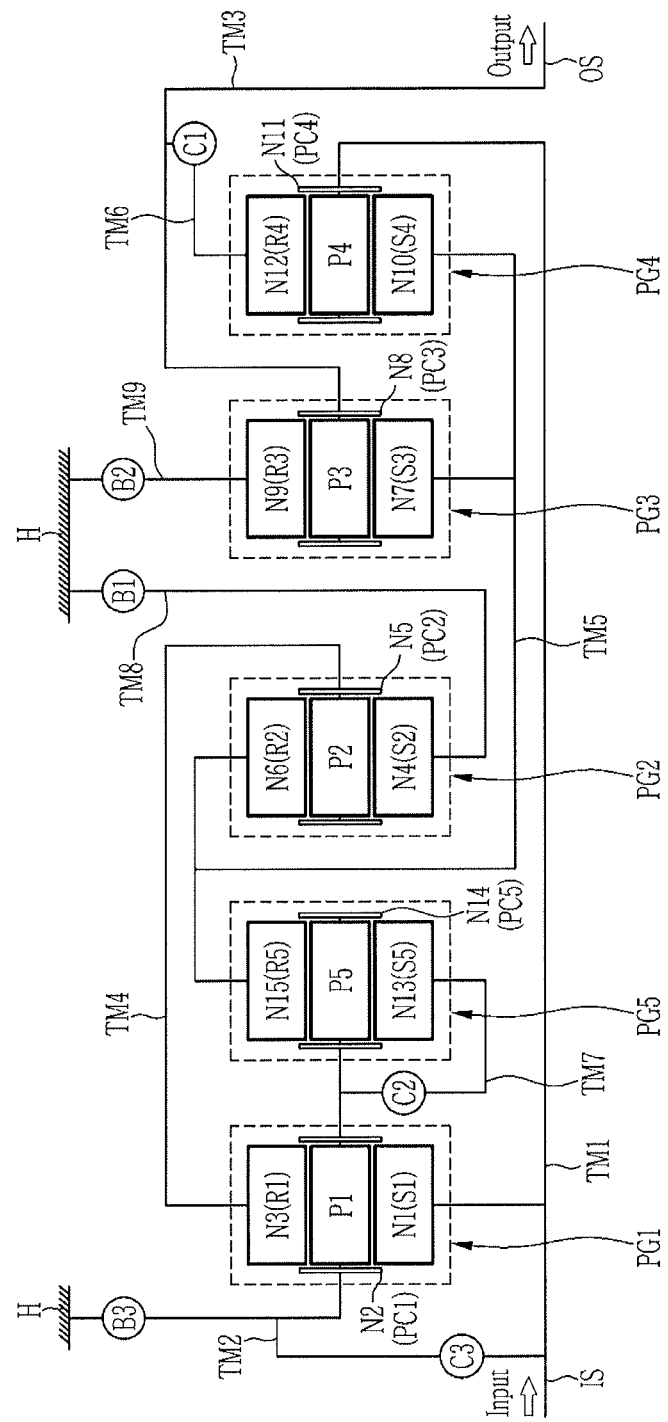
FIG. 5 is a schematic diagram of a planetary gear train according to various exemplary embodiments of the present invention.

FIG. 5 is a schematic diagram of a planetary gear train according to various exemplary embodiments of the present invention.

According to a planetary gear train according to various exemplary embodiments shown in FIG. 1, the second clutch C2 is disposed between the fifth shaft TM5 and the seventh shaft TM7 such that the fifth planetary gear set PG5 integrally rotates by the operation of the second clutch C2. According to a planetary gear train according to various exemplary embodiments shown in FIG. 5, the second clutch C2 is disposed between the second shaft TM2 and the seventh shaft TM7. It may be obviously understood that according to the various exemplary embodiments, the fifth planetary gear set PG5 integrally rotates by the operation of the second clutch C2.

That is, although the various exemplary embodiments differs from the various exemplary embodiments in the location of the second clutch C2, the function and operation of the second clutch C2 to integrally rotate the fifth planetary gear set PG5 remains the same.

That is, the planetary gear train of the various exemplary embodiments may be operated by the same operational chart to achieve the same shaft-stages with the various exemplary embodiments.

Figure 6:
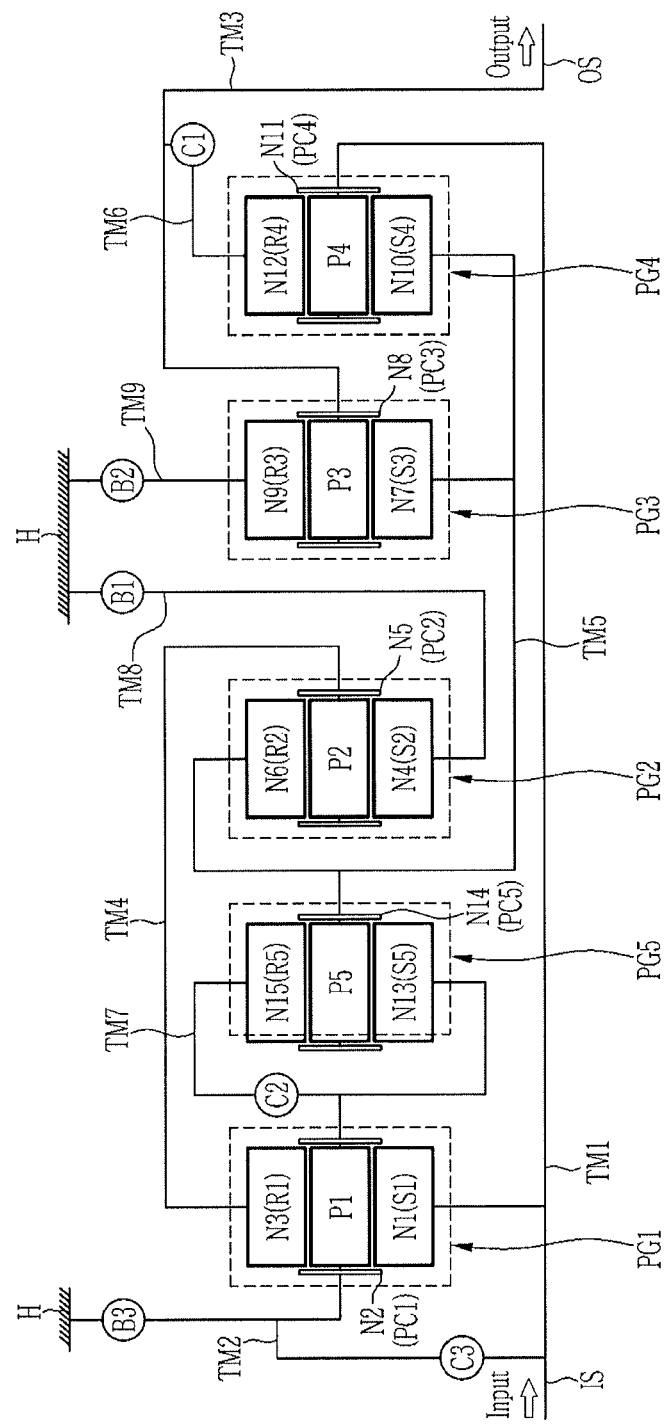
FIG. 6 is a schematic diagram of a planetary gear train according to various exemplary embodiments of the present invention.

FIG. 6 is a schematic diagram of a planetary gear train according to various exemplary embodiments of the present invention.

According to a planetary gear train according to various exemplary embodiments shown in FIG. 5, the thirteenth rotation element N13 is fixedly connected to the seventh shaft TM7, the fourteenth rotation element N14 is fixedly connected to the second shaft TM2, and the fifteenth rotation element N15 is fixedly connected to the fifth shaft TM5. In comparison, according to a planetary gear train according to various exemplary embodiments shown in FIG. 6, the thirteenth rotation element N13 is fixedly connected to the second shaft TM2, the fourteenth rotation element N14 is fixedly connected to the fifth shaft TM5, and the fifteenth rotation element N15 is fixedly connected to the seventh shaft TM7.

Although the various exemplary embodiments differs from the various exemplary embodiments in the fixed connections of the fifth planetary gear set PG5, operations and functions of the overall planetary gear train remains the same.

That is, the planetary gear train of the various exemplary embodiments may be operated by the same operational chart to achieve the same shaft-stages with the various exemplary embodiments, A planetary gear train according to an exemplary embodiment of the present invention may realize nine forward speeds and one reverse speed by controlling five planetary gear sets PG1, PG2, PG3, PG4, and PG5 by three clutches C1, C2, and C3 and three brakes B1, B2, and B3.

Furthermore, a planetary gear train according to an exemplary embodiment of the present invention may realize a gear ratio span of more than 9.1, maximizing efficiency of driving an engine.

While employing five planetary gear sets for nine forward speeds and one reverse speed, engagement elements are minimally employed, reducing drag loss of clutches and brakes, and accordingly improving power delivery efficiency and fuel consumption.

Furthermore, a torque-in-parallel scheme is applied to an output-side planetary gear set, and torque loads of planetary gear sets and engagement elements may become more uniform, such that torque delivery efficiency and durability may be enhanced.

While realizing nine forward speeds and one reverse speed, flexibility of output gear ratio is increased, enhancing linearity of step ratios of shift-stages.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, comprising:
    an input shaft receiving an engine torque;
    an output shaft outputting a shifted torque;
    a first planetary gear set having a first rotation element, a second rotation element, and a third rotation element;
    a second planetary gear set having a fourth rotation element, a fifth rotation element, and a sixth rotation element;
    a third planetary gear set having a seventh rotation element, an eighth rotation element, and a ninth rotation element;
    a fourth planetary gear set having a tenth rotation element, an eleventh rotation element, and a twelfth rotation element;
    a fifth planetary gear set having a thirteenth rotation element, a fourteenth rotation element and a fifteenth rotation element;
    a first shaft fixedly connected to the first rotation element and the eleventh rotation element, and fixedly connected to the input shaft;
    a second shaft fixedly connected to the second rotation element and one rotation element of the fifth planetary gear set, selectively connectable to the input shaft, and selectively connectable to a transmission housing;
    a third shaft fixedly connected to the eighth rotation element and fixedly connected to the output shaft;
    a fourth shaft fixedly connected to the third rotation element and the fifth rotation element;
    a fifth shaft fixedly connected to the sixth rotation element, the seventh rotation element, the tenth rotation element, and other rotation element of the fifth planetary gear set which is not connected to the second shaft;
    a sixth shaft fixedly connected to the twelfth rotation element;
    a seventh shaft fixedly connected to a remaining rotation element of the fifth planetary gear set which is not connected to the first shaft and the second shaft; and
    a plurality of shafts each of which is selectively connectable to the transmission housing and fixedly connected to rotation elements of the second and third planetary gear sets which is not fixedly connected to any of the first to seventh shafts.

2. The planetary gear train apparatus of claim 1,
    wherein the plurality of shafts include;
    an eighth shaft fixedly connected to the fourth rotation element and selectively connectable to the transmission housing; and
    a ninth shaft fixedly connected to the ninth rotation element and selectively connectable to the transmission housing.

3. The planetary gear train apparatus of claim 2, further including:
    a first clutch mounted between the third shaft and the sixth shaft;
    a second clutch mounted between the fifth shaft and the seventh shaft;
    a third clutch mounted between the input shaft and the second shaft,
    a first brake disposed between the eighth shaft and the transmission housing;

a second brake disposed between the ninth shaft and the transmission housing; and a third brake disposed between the second shaft and the transmission housing, wherein the thirteenth rotation element which corresponds to the remaining rotation element of the fifth planetary gear set, is fixedly connected to the seventh shaft, the fourteenth rotation element which corresponds to the one rotation element of the fifth planetary gear set, is fixedly connected to the second shaft, the fifteenth rotation element which corresponds to the other rotation element of the fifth planetary gear set, is fixedly connected to the fifth shaft; and the third shaft and the sixth shaft are selectively connectable to each other, the fifth shaft and the seventh shaft are selectively connectable to each other, and the input shaft and the second shaft are selectively connectable to each other.

4. The planetary gear train apparatus of claim 2, further including:

a first clutch mounted between the third shaft and the sixth shaft;

a second clutch mounted between the fifth shaft and the seventh shaft;

a third clutch mounted between the input shaft and the second shaft, a first brake disposed between the eighth shaft and the transmission housing;

a second brake disposed between the ninth shaft and the transmission housing; and a third brake disposed between the second shaft and the transmission housing, wherein the thirteenth rotation element which corresponds to the remaining rotation element of the fifth planetary gear set, is fixedly connected to the seventh shaft, the fourteenth rotation element which corresponds to the one rotation element of the fifth planetary gear set, is fixedly connected to the fifth shaft, and the fifteenth rotation element which corresponds to the other rotation element of the fifth planetary gear set, is fixedly connected to the second shaft, and the third shaft and the sixth shaft are selectively connectable to each other, the fifth shaft and the seventh shaft are selectively connectable to each other, and the input shaft and the second shaft are selectively connectable to each other.

5. The planetary gear train apparatus of claim 2, further including:

a first clutch mounted between the third shaft and the sixth shaft;

a second clutch mounted between the second shaft and the seventh shaft;

a third clutch mounted between the input shaft and the second shaft, a first brake disposed between the eighth shaft and the transmission housing;

a second brake disposed between the ninth shaft and the transmission housing; and a third brake disposed between the second shaft and the transmission housing, wherein the thirteenth rotation element which corresponds to the remaining rotation element of the fifth planetary gear set, is fixedly connected to the seventh shaft, the fourteenth rotation element which corresponds to the one rotation element of the fifth planetary gear set, is fixedly connected to the fifth shaft, the fifteenth rotation element which corresponds to the other rotation element of the fifth planetary gear set, is fixedly connected to the second shaft, and the third shaft is selectively connectable to the sixth shaft, the second shaft is selectively connectable to the seventh shaft, and the input shaft is selectively connectable to the second shaft.

6. The planetary gear train apparatus of claim 2, further including:

a first clutch mounted between the third shaft and the sixth shaft;

a second clutch mounted between the second shaft and the seventh shaft;

a third clutch mounted between the input shaft and the second shaft, wherein each of the second shaft, the eighth shaft, and the ninth shaft are selectively connectable to the transmission housing, wherein the thirteenth rotation element which corresponds to the remaining rotation element of the fifth planetary gear set, is fixedly connected to the seventh shaft, the fourteenth rotation element which corresponds to the one rotation element of the fifth planetary gear set, is fixedly connected to the second shaft, the fifteenth rotation element which corresponds to the other rotation element of the fifth planetary gear set, is fixedly connected to the fifth shaft, and the third shaft is selectively connectable to the sixth shaft, the second shaft is selectively connectable to the seventh shaft, and the input shaft is selectively connectable to the second shaft.

7. The planetary gear train apparatus of claim 2, further including:

a first clutch mounted between the third shaft and the sixth shaft;

a second clutch mounted between the second shaft and the seventh shaft;

a third clutch mounted between the input shaft and the second shaft, a first brake disposed between the eighth shaft and the transmission housing;

a second brake disposed between the ninth shaft and the transmission housing; and a third brake disposed between the second Shaft and the transmission housing, wherein the thirteenth rotation element which corresponds to the remaining rotation element of the fifth planetary gear set, is fixedly connected to the second shaft, the fourteenth rotation element which corresponds to the one rotation element of the fifth planetary gear set, is fixedly connected to the fifth shaft, the fifteenth rotation element which corresponds to the other rotation element of the fifth planetary gear set, is fixedly connected to the seventh shaft, and the third shaft is selectively connectable to the sixth shaft, the second shaft is selectively connectable to the seventh shaft, and the input shaft is selectively connectable to the second shaft.

8. The planetary gear train apparatus of claim 1, wherein the first rotation element, the second rotation element, and the third rotation element are a first sun gear, a first planet carrier, and a first ring gear, respectively, the fourth rotation element, the fifth rotation element, and the sixth rotation element are a second sun gear, a second planet carrier, and a second ring gear, respectively, the seventh rotation element, the eighth rotation element, and the ninth rotation element are a third sun gear, a third planet carrier, and a third ring gear, respectively, the tenth rotation element, the eleventh rotation element, and the twelfth rotation element are a fourth sun gear, a fourth planet carrier, and a fourth ring gear, respectively the thirteenth rotation element, the fourteenth rotation element, and the fifteenth rotation element are a fifth sun gear, a fifth planet carrier, and a fifth ring gear.

9. The planetary gear train apparatus of claim 1, wherein the first, second, third, fourth, and fifth planetary gear sets are disposed in an order of the first, fifth, second, third, and fourth planetary gear sets from the input shaft.

10. A planetary gear train apparatus of an automatic transmission for a vehicle, including:
an input shaft receiving an engine torque;
an output shaft outputting a shifted torque;
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, and a ninth rotation element;
a fourth planetary gear set having a tenth rotation element, an eleventh rotation element, and a twelfth rotation element;
a fifth planetary gear set having a thirteenth rotation element, a fourteenth rotation element, and a fifteenth rotation element;
wherein the first rotation element is fixedly connected to the eleventh rotation element and the input shaft,
the second rotation element is selectively connectable to the input shaft, and selectively connectable to a transmission housing,
the eighth rotation element is fixedly connected to the output shaft, and selectively connectable to the twelfth rotation element,
the third rotation element is fixedly connected to the fifth rotation element,
the fourth rotation element is selectively connectable to the transmission housing,
the sixth rotation element is fixedly connected to the seventh rotation element and the tenth rotation element,
the ninth rotation element is selectively connectable to the transmission housing,
one rotation element of the fifth planetary gear set is fixedly connected to the second rotation element,
other rotation element of the fifth planetary gear set is fixedly connected to the sixth rotation element, and
a remaining rotation element of the fifth planetary gear set is selectively connectable to the one or the other rotation element of the fifth planetary gear set.

11. The planetary gear train apparatus of claim 10, wherein
the fourteenth rotation element which corresponds to the one rotation element of the fifth planetary gear set is fixedly connected to the second rotation element;
the fifteenth rotation element which corresponds to the other rotation element of the fifth planetary gear set is fixedly connected to the sixth rotation element; and
the thirteenth rotation element which corresponds to the remaining rotation element of the fifth planetary gear set is selectively connectable to one of the fourteenth and fifteenth rotation elements.

12. The planetary gear train apparatus of claim 11, further including:
a first clutch mounted between the eighth rotation element and the twelfth rotation element;
a second clutch mounted between the thirteenth rotation element and the fifteenth rotation element;
a third clutch mounted between the input shaft and the second rotation element;
a first brake disposed between the fourth rotation element and the transmission housing;
a second brake disposed between the ninth rotation element and the transmission housing; and
a third brake disposed between the second rotation element and the transmission housing.

13. The planetary gear train apparatus of claim 11, further including:
a first clutch mounted between the eighth rotation element and the twelfth rotation element;
a second clutch mounted between the thirteenth rotation element and the fourteenth rotation element;
a third clutch mounted between the input shaft and the second rotation element;
a first brake disposed between the fourth rotation element and the transmission housing;
a second brake disposed between the ninth rotation element and the transmission housing; and
a third brake disposed between the second rotation element and the transmission housing.

14. The planetary gear train apparatus of claim 10, wherein
the fifteenth rotation element which corresponds to the other rotation element of the fifth planetary gear set is fixedly connected to the second rotation element;
the fourteenth rotation element which corresponds to the one rotation element of the fifth planetary gear set is fixedly connected to the sixth rotation element; and
the thirteenth rotation element which corresponds to the remaining rotation element of the fifth planetary gear set is selectively connectable to one of the fourteenth and fifteenth rotation elements.

15. The planetary gear train apparatus of claim 14, further including:
a first clutch mounted between the eighth rotation element and the twelfth rotation element;
a second clutch mounted between the thirteenth rotation element and the fourteenth rotation element;
a third clutch mounted between the input shaft and the second rotation element;
a first brake disposed between the fourth rotation element and the transmission housing;
a second brake disposed between the ninth rotation element and the transmission housing; and
a third brake disposed between the second rotation element and the transmission housing.

16. The planetary gear train apparatus of claim 14, further including:
a first clutch mounted between the eighth rotation element and the twelfth rotation element;
a second clutch mounted between the thirteenth rotation element and the fifteenth rotation element;
a third clutch mounted between the input shaft and the second rotation element;

a first brake disposed between the fourth rotation element and the transmission housing;
a second brake disposed between the ninth rotation element and the transmission housing; and
a third brake disposed between the second rotation element and e transmission housing.

17. The planetary gear train apparatus of claim 10, wherein
the thirteenth rotation element which corresponds to the remaining rotation element of the fifth planetary gear set is fixedly connected to the second rotation element;
the fourteenth rotation element which corresponds to the one rotation element of the fifth planetary gear set is fixedly connected to the sixth rotation element; and
the fifteenth rotation element which corresponds to the other rotation element of the fifth planetary gear set is selectively connectable to the thirteenth rotation element.

18. The planetary gear train apparatus of claim 17, further including:
a first clutch mounted between the eighth rotation element and the twelfth rotation element;
a second clutch mounted between the thirteenth rotation element and the fifteenth rotation element;
a third clutch mounted between the input shaft and the second rotation element;
a first brake disposed between the fourth rotation element and the transmission housing;
a second brake disposed between the ninth rotation element and the transmission housing; and
a third brake disposed between the second rotation element and the transmission housing.

19. The planetary gear train apparatus of claim 10, wherein
the first, second and third rotation elements are respectively a first sun gear, a first planet carrier, and a first ring gear of the first planetary gear set;
the fourth, fifth, and sixth rotation elements are respectively a second sun gear, a second planet carrier, and a second ring gear of the second planetary gear set;
the seventh, eighth, and ninth rotation elements are respectively a third sun gear, a third planet carrier, and a third ring gear of the third planetary gear set;
the tenth, eleventh, and twelfth rotation elements are respectively a fourth sun gear, a fourth planet carrier, and a fourth ring gear of the fourth planetary gear set; and
the thirteenth, fourteenth, and fifteenth rotation elements are respectively a fifth sun gear, a fifth planet carrier, and a fifth ring gear of the fifth planetary gear set.

20. The planetary gear train apparatus of claim 10, wherein the first, second, third, fourth, and fifth planetary gear sets are disposed in an order of the first, fifth, second, third, and fourth planetary gear sets from the input shaft.

\* \* \* \* \*